(12) United States Patent
Söder

(10) Patent No.: US 12,515,573 B2
(45) Date of Patent: Jan. 6, 2026

(54) METHOD FOR DETERMINING A MATERIAL DISTRIBUTION CONDITION IN A TIPPER BODY

(71) Applicant: Volvo Truck Corporation, Gothenburg (SE)

(72) Inventor: Richard Söder, Nödinge (SE)

(73) Assignee: Volvo Truck Corporation, Gothenburg (SE)

( * ) Notice: Subject to any disclaimer, the term of this patent is extended or adjusted under 35 U.S.C. 154(b) by 123 days.

(21) Appl. No.: 18/560,448

(22) PCT Filed: Jun. 28, 2021

(86) PCT No.: PCT/EP2021/067711
§ 371 (c)(1),
(2) Date: Nov. 13, 2023

(87) PCT Pub. No.: WO2023/274496
PCT Pub. Date: Jan. 5, 2023

(65) Prior Publication Data
US 2024/0253549 A1    Aug. 1, 2024

(51) Int. Cl.
*B60P 1/00*    (2006.01)
*B60P 1/04*    (2006.01)
*G06T 7/00*    (2017.01)
*G06T 7/62*    (2017.01)
*G06T 7/66*    (2017.01)

(52) U.S. Cl.
CPC ........... *B60P 1/045* (2013.01); *G06T 7/62* (2017.01); *G06T 7/66* (2017.01); *G06T 2207/30252* (2013.01)

(58) Field of Classification Search
CPC ... G06T 7/62; G06T 7/66; G06T 2207/30252; B60P 1/045
USPC ................................................. 701/50
See application file for complete search history.

(56) References Cited

U.S. PATENT DOCUMENTS

| 2018/0239849 A1* | 8/2018 | Martinsson | ............... E02F 3/40 |
| 2020/0279377 A1* | 9/2020 | Gabel | ..................... G06T 7/254 |

FOREIGN PATENT DOCUMENTS

| CN | 107444269 A | 12/2017 |
| CN | 111038355 A * | 4/2020 |
| FR | 2864947 A1 | 7/2005 |

OTHER PUBLICATIONS

English Translation of CN 111038355 (Year: 2019).*
(Continued)

*Primary Examiner* — Tiffany P Young
(74) *Attorney, Agent, or Firm* — Withrow & Terranova, PLLC

(57) ABSTRACT

A method for determining a material distribution condition in a tipper body of a tipper vehicle during a tipping event, the tipper body having a longitudinal extension along a longitudinal axis, and being arranged to be pivoted about a transversal axis, perpendicular to the longitudinal axis, during the tipping event, the method comprising generating an image of a surface of the material in the tipper body during the tipping event, and determining the material distribution condition in the tipper body using the image. A method for controlling a tipping event using the method, to a system, and to a vehicle are also disclosed.

20 Claims, 3 Drawing Sheets

(56) References Cited

OTHER PUBLICATIONS

International Search Report and Written Opinion for International Patent Application No. PCT/EP2021/06771, mailed Mar. 29, 2022, 11 pages.

* cited by examiner

METHOD FOR DETERMINING A MATERIAL DISTRIBUTION CONDITION IN A TIPPER BODY

PRIORITY APPLICATIONS

This application is a 35 USC 371 national phase filing of International Application No. PCT/EP2021/067711, filed Jun. 28, 2021, the disclosure of which is incorporated herein by reference in its entirety.

TECHNICAL FIELD

The present disclosure relates to a method for determining a material distribution condition in a tipper body of a tipper vehicle during a tipping event. Also, the disclosure relates to a method for controlling a tipping event of a tipper body of a tipper vehicle. The disclosure also relates to a system, a computer program, and a computer readable medium for implementing the methods, and to a vehicle.

BACKGROUND

Tipper vehicles may be used for transporting different types of loads, such as for example stones, clay, sand, gravel, construction or demolition waste. When loading the tipper body, care is usually taken to distribute the load in an even manner so as to avoid imbalance of the vehicle during transport. An example of a tipper vehicle is a hauler.

However, during a tipping event of the tipper vehicle, i.e. when the tipper body is pivoted to release the load from the tipper body, the load in the tipper body may be dislodged in a manner which renders the load still inside the tipper body to be unevenly distributed therein.

Thus, even when the load in the tipper body is evenly distributed in the tipper body prior to transport, the vehicle may become imbalanced during the tipping event and/or during transport.

Sometimes the imbalance may be such that the tipper vehicle risks overturning. If the user is alerted of the imbalance, e.g. by a bystander, he/she may select to immediately abort the tipping event, e.g. by lowering the tipper body to a transport position. However, unless the user is alerted, the imbalance may, in a worst case scenario, result in an accident where the tipper vehicle is overturned.

In view of the above, there is a need for alternatives and/or improvements relating to the load distribution in a tipper vehicle during a tipping event.

SUMMARY

A first object of the invention is to provide an alternative and/or an improvement relating to the load distribution in a tipper vehicle during a tipping event.

The object is achieved by a method for determining a material distribution in a tipper body. Thus, there is provided a method for determining a material distribution condition in a tipper body of a tipper vehicle during a tipping event, the tipper body having a longitudinal extension along a longitudinal axis, and being arranged to be pivoted about a transversal axis, perpendicular to the longitudinal axis, during the tipping event. The method comprises: generating an image of a surface of the material in the tipper body during the tipping event, and determining the material distribution condition in the tipper body using the image.

This implies that a material distribution condition for the load in the tipper body may be determined during a tipping event. With such a material distribution condition, solutions e.g. for alleviating the risk of a vehicle overturning during a tipping event may be made available.

Generally, the tipper body of a tipper vehicle has a transport position which is assumed during transport of the tipper vehicle. For tipping the load from the tipper body, the tipper body is pivoted from the transport position, to at least one tipping position wherein the load may leave the tipper body under the action of gravity.

With "a tipping event" is meant herein when the tipper body is in any pivoted position in relation to the transport position, in which pivoted position load may be released from the tipper body.

Optionally, the material distribution condition in the tipper body is determined by comparing the image with one or more predefined images associated with the tipper body.

Optionally, machine learning may be used to provide the predefined images. Alternatively or in addition, machine learning may be used to determine the material distribution condition using the predefined images.

Optionally, the method comprises determining a centre of gravity parameter indicative of a centre of gravity along the transversal axis of the material in the tipper body during the tipping event using the image.

This implies that imbalance of the load in the tipper body along the transversal axis may be determined based on a centre of gravity parameter.

Optionally, the method comprises determining an overturn parameter indicative of a risk of the tipper vehicle overturning using the material distribution condition. Purely by way of example, such an overturn parameter may be determined on the basis of an overturning moment, e.g. around the longitudinal axis, imparted by the material in the tipper body.

Optionally, the method comprises: issuing a signal indicative of the material distribution condition in the tipper body, the centre of gravity parameter and/or the turnover parameter.

For example, the method may comprise issuing a warning signal if the material distribution condition, centre of gravity parameter and/or turnover parameter indicates a risk for the vehicle overturning.

Optionally, the warning signal may be issued to a user of the vehicle, which may choose to abort the tipping event when receiving the warning. A warning signal to a user could for example be an audible or a visible warning.

Optionally, the signal may be used e.g. to determine and/or apply countermeasures to balance the vehicle. For example, the signal may be issued to a system.

Optionally, the image comprises information indicative of a centre of gravity along the transversal axis of the material in the tipper body.

Optionally, the image comprises information as regards a topography of the surface with reference to a plane parallel to the transversal axis and perpendicular to the longitudinal axis.

Optionally, the one or more predefined images are dependent on the type of material in the tipper body.

Optionally, the one or more predefined images are dependent on a loading condition in the tipper body.

Optionally, the type of material in the tipper body is determined using information indicative of the weight of the material and the volume of the material, preferably, the volume of the material being determined using the image of a surface of the material in the tipper body during the tipping event.

Alternatively, the type of material in the tipper body may be provided as an input to the method, for example by a user.

According to a second aspect, the object is achieved by a method for controlling a tipping event of a tipper body. Thus, there is provided a method for controlling a tipping event of a tipper body of a tipper vehicle, comprising determining a material distribution condition in the tipper body in accordance with the first aspect in the above, determining an overturn parameter, and, in response to determining that said overturn parameter indicates a risk of the tipper vehicle overturning exceeding a risk threshold, initiating a countermeasure to balance the vehicle.

Alternatively or additionally, there is provided a method for controlling a tipper event of a tipper body of a tipper vehicle, comprising determining a material distribution condition in the tipper body in accordance with the first aspect in the above, and in response to determining that said material distribution condition indicates an imbalance of said vehicle exceeding an imbalance threshold, initiating a countermeasure to balance the vehicle.

Optionally, the method comprises determining a material distribution condition in the tipper body in accordance with the first aspect in the above for a plurality of subsequent time instances during the tipping event.

Optionally, the method comprises issuing a signal indicative of the countermeasure to balance the vehicle. For example, such a signal may be issued to a user of the vehicle, who may then select to apply the countermeasure to balance the vehicle.

Optionally, the method comprises applying the countermeasure to balance the vehicle. Thus, the method automatically applies the determined countermeasure to balance the vehicle.

Optionally, the countermeasure comprises aborting the tipping event, i.e. pivoting the tipper body towards the transport position.

Optionally, the countermeasure may comprise using counter balancing elements for controlling the position of the tipper body to balance the tipper vehicle. For example, such counter balancing elements may be actuators applied to one or more sides of the tipper body, enabling altering the position of the tipper body. The counter balancing elements may be individually adjustable to alter the position of the tipper body to balance the tipper vehicle. For example, the countermeasure may involve pivoting the tipper body in relation to the transversal axis and/or the longitudinal axis of the tipper body.

Optionally, the countermeasure may be determined using the weight of the vehicle.

Optionally, the countermeasure may be determined using the type of material in the load.

In a third aspect, the object is achieved by a system. Thus, there is provided a system for determining a material distribution condition in a tipper body of a tipper vehicle during a tipping event, the tipper body having a longitudinal extension along a longitudinal axis, and being arranged to be pivoted about a transversal axis, perpendicular to the longitudinal axis, during the tipping event, the system comprising one or more imaging devices for generating an image of a surface of the material in the tipper body during the tipping event, and a control unit configured for determining a material distribution condition in the tipper body using the image.

Optionally, the control unit is adapted to perform the method according to the first aspect and/or the second aspect as described in the above.

Optionally, one or more imaging devices are arranged to the tipper body.

Optionally, the system is adapted to apply countermeasures to balance the vehicle during the tipping event using the material distribution condition.

In a fourth aspect, the object is achieved by a computer program. Thus, there is provided a computer program comprising program code means for performing the steps of any of the methods of the first aspect as described in the above when the program is run on a computer.

In a fourth aspect, the object is achieved by a computer readable medium. Thus, there is provided a computer readable medium carrying a computer program comprising program code means for performing the steps of any of the methods of the first aspect as described in the above when the program product is run on a computer.

In a fifth aspect, the object is achieved by a vehicle. Thus, there is provided a vehicle comprising or being operatively connected to a system in accordance with the third aspect as described in the above.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
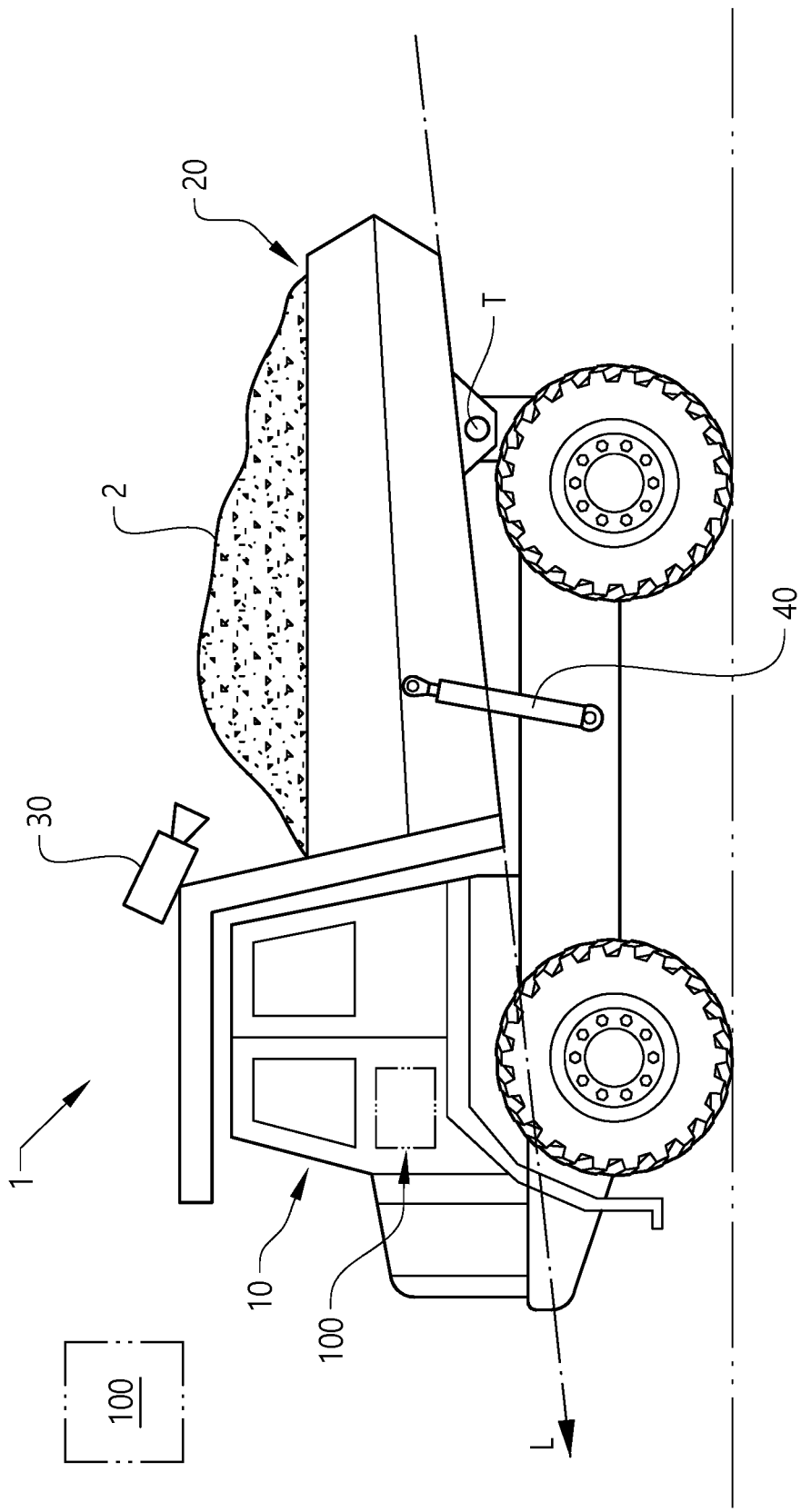
FIG. 1 is a schematic side view of a variant of a tipper vehicle according to the fifth aspect as described herein, for which the methods and system as described herein may be implemented.

FIG. 1 illustrates a variant of a tipper vehicle 1 as disclosed herein for which the methods as disclosed herein may be implemented.

The tipper vehicle 1 comprises a tipper vehicle body 10 and a tipper body 20. The tipper body 20 has a longitudinal extension along a longitudinal axis L and is arranged to be pivoted about a transversal axis T, perpendicular to the longitudinal axis L. As exemplified in FIG. 1, the longitudinal axis L may be located in the same vertical plane as a longitudinal axis of the tipper vehicle 1, wherein the longitudinal axis of the tipper vehicle generally indicates a direction of travel of the tipper vehicle 1.

Moreover, FIG. 1 illustrates that the tipper body 20 is filled with material 2. Purely by way of example, the material 2 may comprise sand, gravel, soil, pebbles, rocks, clay, construction waste, demolition waste or the like.

Figure 2:
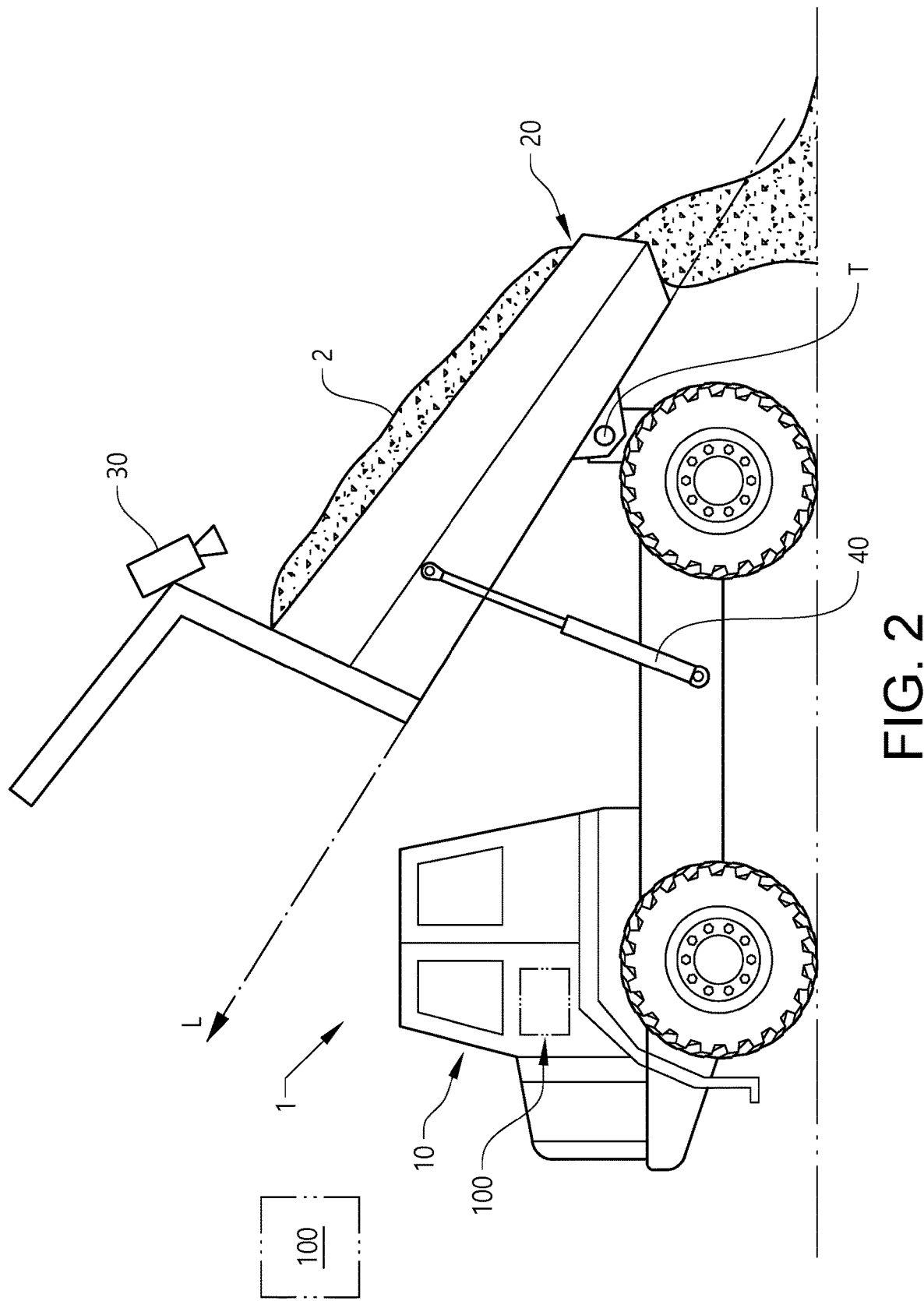
FIG. 2 is a schematic side view of the vehicle in FIG. 1, when in a tipping position.

The tipper body 20 is arranged to be pivotable from a transport position as illustrated in FIG. 1, to a tipping position e.g as illustrated in FIG. 2. Purely by way of example, the tipper body 20 may be pivotable relative to the tipper vehicle body 10 and this may apply for any embodiment and aspect of the present invention.

FIG. 1 further illustrates a system for determining a material condition in a tipper body during a tipping event. The system comprises one or more imaging devices 30 for generating an image of a surface of the material 2 in the tipper body 20 during the tipping event, and a control unit 100 configured for determining a material distribution condition in the tipper body 20 using the image.

The one or more imaging devices 30 may be any imaging device(s) suitable for providing a signal or signals for generating an image of a surface of the material 2 in the tipper body 20 during a tipping event. For example, the imaging device 30 may be a camera.

In the example of FIG. 1, the system comprises one imaging device 30. In this particular example, the imaging device 30 is arranged at a front portion of the tipper body 20 (i.e. towards the intended direction of travel of the tipper vehicle). In other examples, one or more imaging devices 30 may be arranged at the front portion, the back portion and/or the side portions of the tipper body 20. It is further envisaged that in embodiments of the present invention, one or more imaging devices 30 need not necessarily be connected to the tipper vehicle 1.

The one or more imaging devices 30 may be arranged to the tipper body 20 in a configuration being such that the one or more imaging devices 30 provide(s) a signal or signals for generating the image of a surface of the material 2 in the tipper body 20 during a tipping event.

Further, in the example in FIG. 1, the tipper vehicle 1 comprises an actuator 40. The actuator may be arranged to execute the tipping event, i.e. to pivot the tipper body 2 from a transport position as illustrated in FIG. 1, to a tipping position, e.g. as illustrated in FIG. 2.

Further, in the example in FIG. 1, the tipper vehicle 1 comprises the control unit 100 of the system. However, and as indicated with dashed and dotted lines in FIG. 1, it is also envisaged that the control unit 100 may be remote from the tipper vehicle 1.

The control unit 100 is configured for determining a material distribution condition in the tipper body 20 using the image generated via the one or more imaging devices 30 of the system.

Further, the control unit may be configured for determining a centre of gravity parameter indicative of a centre of gravity along the universal axis T of the material in the tipper body during the tipping event using the image.

Alternatively or in addition, the control unit may be configured for determining an overturn parameter indicative of a risk of the tipper vehicle overturning using the material distribution condition.

To this end, the control unit 100 may be arranged to receive information from the imaging device(s) 30.

The system may further be configured for issuing a signal, such as a signal indicative of the material distribution condition in the tipper body, the centre of gravity along the universal axis T of the material in the tipper body 20 and/or the overturn parameter.

Such a signal may be issued e.g. to a user of the vehicle, who may then chose to control the tipper vehicle 1 in view of the information received from the signal.

Purely as an example, the system may issue a warning signal indicative of a risk of the vehicle overturning, to a user. Such a warning signal may for example be a visible and/or audible warning. In response to such a warning signal, the user may for example chose to control the tipper body 20 so as to pivot the tipper body 20 towards, or even all the way down to, the transport position.

In another example, the signal issued from the system may be used to provide automatic control of the tipper body 20.

Optionally, the system may be adapted to, in response to determining an imbalance of the material distribution, determining a countermeasure to balance the vehicle.

For example, such a countermeasure may involve pivoting the tipper body 20 towards the transport position, such as pivoting the tipper body 20 to the transport position, i.e. aborting the tipping event. Thus, in this example, the countermeasure may involve controlling the pivoting of the tipper body about the transversal axis T only.

Alternatively or in addition, such a countermeasure may involve using counterbalancing elements for controlling the position of the tipper body to balance the tipper vehicle. The countermeasure may, as intimated in the above description of the counterbalancing elements, involve controlling the position of the tipper body about the transversal axis T and/or the longitudinal axis L.

One or more counter balancing elements, such as actuators 40, may be arranged to enable control of the position of the tipper body to balance the tipper vehicle. Such counter balancing elements could, but need not, also be involved in executing the tipping event by controlling the pivoting of the tipper body 2 about the transversal axis T.

For example, the actuator 40 as described in the above in relation to FIG. 1 and which is used to execute the tipping event, may act as a counter balancing element and thus be controlled so as to pivot the tipper body 2 towards the transport position, i.e. to lower the tipper body 2, so as to control the position of the tipper body to balance the vehicle.

Optionally, the actuator 40 may be controlled so as to pivot the tipper body 2 back to the transport position, i.e. to abort the tipping event. It will be understood that one or more actuators 40, arranged to pivot the tipper body 2 around the transversal axis T, may be used as counterbalancing elements for balancing the tipper vehicle as described in the above.

In accordance with examples, the one or more counter balancing elements may be arranged to be individually controlled.

As another non-limiting example of the counter balancing elements a suspension system (not shown) of the tipper vehicle 1 may be used for adjusting the inclination of the tipper vehicle 1. For instance, in the event that a risk of vehicle overturning in a certain direction around the longitudinal axis is determined, the suspension system may be employed for imparting the tipper vehicle 1 an inclination in the opposite direction.

Purely by example, the tipper body may comprise at least one counter balancing element, arranged on a lateral side of the tipper body 40, the counter balancing element being configured to enable control of the tipper body implying the pivoting of the tipper body 20 about the longitudinal axis L. Thus, an imbalance caused by the centre of gravity of the material 2 in the load being displaced along the transversal axis T may be counteracted by means of the counter balancing element.

Purely by example, the tipper body may comprise at least two counter balancing elements, arranged on each lateral side of the tipper body 40, the counter balancing elements being individually controlled so as to enable control of the tipper body implying pivoting of the tipper body 20 about the longitudinal axis L. Thus, an imbalance caused by the centre of gravity of the material 2 in the load being displaced along the transversal axis T may be counteracted by means of the counter balancing elements.

It will be understood that it may not be necessary to achieve complete balance of the tipper vehicle, i.e. it is not necessary that e.g. that all of the ground contacting elements of the vehicle carries the same load. Instead, to balance the tipper vehicle it is sufficient that the centre of gravity of the tipper vehicle is such that a risk of the vehicle overturning is alleviated.

For example, the determination of the counter measure may use the weight of the vehicle, the weight of the load, and/or the type of load.

Purely by example, the system may be arranged to transmit a signal indicative of the countermeasure to a user, e.g. via a display or via audible means.

Optionally, the system may be adapted to apply the determined countermeasure to balance the vehicle during the tipping event. Thus, the system may be adapted to control the counterbalancing element or elements of the vehicle, to execute the determined countermeasure to balance the vehicle. To this end, the control unit 100 of the system may be in communication with the counterbalancing element(s) 40.

Further, the control unit 100 may be adapted to receive information for example regarding the type of material 2 loaded in the tipper body 20. The control unit 100 may be adapted to receive and/or to store information regarding the tipper vehicle, such as the vehicle weight.

According to alternatives, the control unit 100 may be adapted to determine the type of material 2 in the tipper body 20 using information indicative of the weight of the material 2 and the volume of the material 2. For example, the volume of the material 2 may be determined using the image of the surface of the material in the tipper body 20 during the tipping event.

Figure 4:
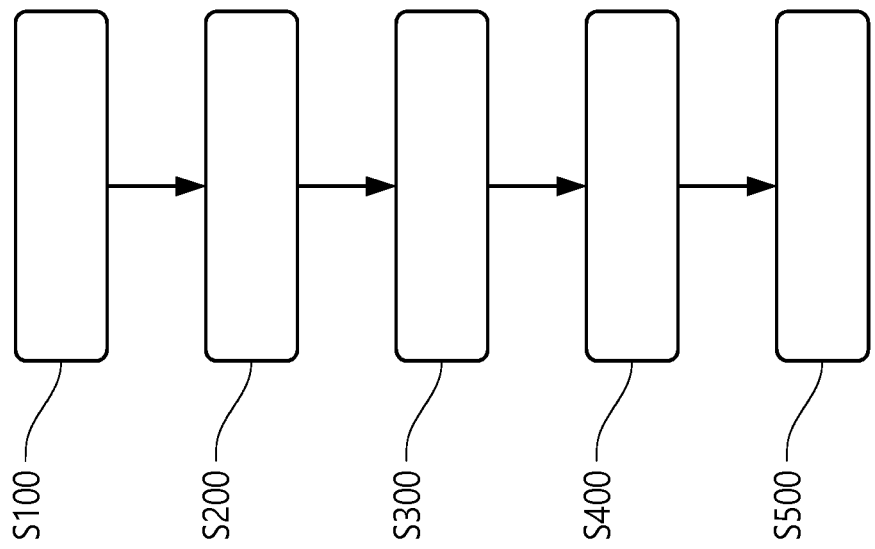
FIG. 4 is a schematic flow chart of a variant of a method according to the first aspect of the invention.

As such, the system for determining a material distribution condition in a tipper body 2 as described in the above may utilise a method for determining a material distribution condition in the tipper body. Purely as an example, the flow chart of FIG. 4 illustrates a variant of such a method.

As such, the method comprises
Generating an image of a surface of the material 2 in the tipper body 20 during the tipping event S100, and
Determining the material distribution condition in the tipper body using the image.

The imaging device 30 of the tipper vehicle 1 is configured to generate an image of a surface of the material 2 in the tipper body 20 during a tipping event S200.

Figure 3:
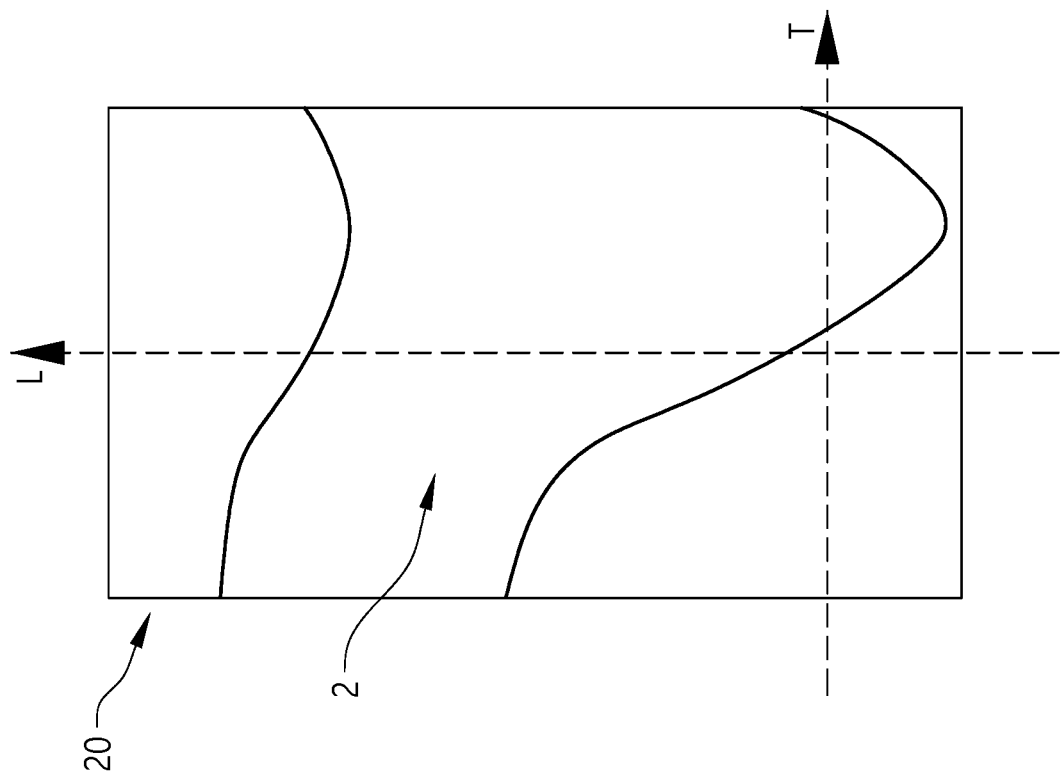
FIG. 3 is a schematic example of an image of the tipper body of the vehicle of FIGS. 1 and 2, with an example of a load distribution during a tipping event.

Purely by example, FIG. 3 illustrates an image of the tipper body 20 and material 2 of the vehicle of FIGS. 1 and 2, during a tipping event. The illustrative example of FIG. 3 is an image as seen in a top view of the tipper body 20, i.e. from a plane parallel with the longitudinal axis L and the transversal axis T. However, in other examples, the image may be taken from other views, such as from a parallel with the transversal axis T and perpendicular to the longitudinal axis L.

In some variants, it may be preferred if the image is such that the contour of the load towards the unloading direction may be identified.

The example of FIG. 3 illustrates an example of a load, typically of a relatively fine material such as sand, soil or clay, where an uneven distribution of the load as seen along the transversal axis T appears during the tipping event.

Optionally, the method may comprise comparing the image, such as the image exemplified in FIG. 3, with one or more predefined images associated with the tipper body 20.

The predefined images need not exclusively be based on the relevant tipper body 20. It is envisaged that the predefined images may also be dependent e.g. on the type of material 2 loaded in the tipper body 20. For example, such predefined images may reflect different tipping events and/or different types of material which may be used to determine a material distribution condition in the tipper body. For example, the determination of the material distribution condition may be made based on correspondence with a predefined image which has been predetermined to indicate a certain material distribution condition such as for example a risk of overturn of the tipper vehicle.

For example, the determination of the material distribution condition in the tipper body 2 using the image may be based on machine learning from different tipping events and/or different types of materials. As such, the machine learning system may per se learn which predefined images correspond to what material distribution conditions, and for example the determination of the material distribution condition may immediately be made by the machine learning system.

Alternatively or in addition, the one or more predefined images may be dependent on a loading condition in the tipper body 20. For example, different sets of predefined images may be used for loading conditions corresponding to different amounts of material 2 in the tipper body 20.

In some variants, the method may comprise
determining a centre of gravity parameter indicative of a centre of gravity along the transversal axis T of the material 2 in the tipper body 20 during the tipping event using the image S300.

Alternatively or additionally, the method may determine an overturn parameter indicative of a risk of the tipper vehicle 1 overturning using the material distribution condition S400.

The image may comprise information indicative of a centre of gravity along the transversal axis T of the material 2 in the tipper body 20.

For example, the image may comprise information indicative of the symmetry of the surface about the longitudinal axis L of the tipper body.

For example, the image may comprise information as regards a topography of the surface with reference to a plane parallel to the transversal axis T and perpendicular to the longitudinal axis L.

In some variants, the type of material 2 in the tipper body 20 may be determined using information indicative of the weight of the material 2 and the volume of the material 2. The volume of the material 2 may optionally be determined using the image of a surface of the material in the tipper body 20 during the tipping event.

In some variants, the type of material may be provided as an input to the method.

It will be understood that the method of determining a material distribution condition in the tipper body 20 may optionally be performed for a plurality of subsequent time instances during the tipping event.

It is to be understood that the invention is not limited to the variants described in the above or as illustrated in the drawings, but that other options and alternatives will be available to the person skilled in the art.

The invention claimed is:

1. A method for determining a material distribution condition in a tipper body of a tipper vehicle during a tipping event, the tipper body having a longitudinal extension along a longitudinal axis, and being arranged to be pivoted about a transversal axis, perpendicular to the longitudinal axis, during the tipping event, the method comprising:
generating, by a control unit, an image of a surface of the material in the tipper body during the tipping event,
determining, by the control unit, the material distribution condition in the tipper body using the image, and in response to determining a risk of the vehicle, applying, by the control unit, at least one countermeasure to balance the vehicle during the tipping event using the material distribution condition.

2. The method of claim 1, wherein the material distribution condition in the tipper body is determined by:
comparing the image with one or more predefined images associated with the tipper body.

3. The method of claim 1, wherein the method further comprises:
determining a center of gravity parameter indicative of a center of gravity along the transversal axis of the material in the tipper body during the tipping event using the image.

4. The method of claim 1, wherein the method further comprises determining an overturn parameter indicative of a risk of the tipper vehicle overturning using the material distribution condition.

5. The method of claim 1, wherein the method further comprises:
issuing a signal indicative of the material distribution condition in the tipper body, the center of gravity parameter, and/or the turnover parameter.

6. The method of claim 1, wherein the image comprises information indicative of a center of gravity along the transversal axis of the material in the tipper body.

7. The method of claim 1, wherein the image comprises information regarding a topography of the surface with reference to a plane parallel to the transversal axis and perpendicular to the longitudinal axis.

8. The method of claim 2, wherein the one or more predefined images are dependent on the type of material in the tipper body.

9. The method of claim 2, wherein the one or more predefined images are dependent on a loading condition in the tipper body.

10. The method of claim 8, wherein the type of material in the tipper body is determined using information indicative of the weight of the material and the volume of the material.

11. The method of claim 10, wherein the volume of the material is determined using the image of the surface of the material in the tipper body during the tipping event.

12. A method for controlling a tipping event of a tipper body of a tipper vehicle, the tipper body having a longitudinal extension along a longitudinal axis, and being arranged to be pivoted about a transversal axis, perpendicular to the longitudinal axis, during the tipping event, the method comprising:
determining, by control unit, a material distribution condition in the tipper body of the tipper vehicle during a tipping event by:
generating, by the control unit, an image of a surface of the material in the tipper body during the tipping event,
determining, by the control unit, the material distribution condition in the tipper body using the image,
determining, by the control unit, an overturn parameter indicative of a risk of the tipper vehicle overturning using the material distribution condition, and
in response to determining that the overturn parameter indicates a risk of the tipper vehicle overturning exceeding a risk threshold, initiating, by the control unit, a countermeasure to balance the vehicle.

13. The method of claim 12, further comprising determining the material distribution condition in the tipper body for a plurality of subsequent time instances during the tipping event.

14. A system for determining a material distribution condition in a tipper body of a tipper vehicle during a tipping event, the tipper body having a longitudinal extension along a longitudinal axis, and being arranged to be pivoted about a transversal axis, perpendicular to the longitudinal axis, during the tipping event, the system comprising:
one or more imaging devices configured for generating an image of a surface of the material in the tipper body during the tipping event, and
a control unit configured for determining a material distribution condition in the tipper body using the image;
wherein the system is adapted to apply at least one countermeasure to balance the vehicle during the tipping event using the material distribution condition.

15. The system of claim 14, wherein the control unit is adapted to perform a method for determining a material distribution condition in a tipper body of a tipper vehicle during a tipping event, the tipper body having a longitudinal extension along a longitudinal axis, and being arranged to be pivoted about a transversal axis, perpendicular to the longitudinal axis, during the tipping event, the method comprising:
generating an image of a surface of the material in the tipper body during the tipping event, and
determining the material distribution condition in the tipper body using the image.

16. The system of claim 14, wherein the one or more imaging devices are arranged to the tipper body.

17. The system of claim 14, wherein a countermeasure comprises pivoting the tipper body towards a transport position of the tipper body.

18. A non-transitory computer program product comprising program code for performing, when executed by a computer, the steps of claim 1.

19. A non-transitory computer readable medium comprising a computer program comprising program code, which when executed by a computer, performs the steps of claim 1.

20. A vehicle comprising or being operatively connected to the system of claim 14.

\* \* \* \* \*